Sept. 5, 1967   R. L. IGNELL   3,339,605
LID-COVERED CONTAINER

Filed Feb. 25, 1966   3 Sheets-Sheet 1

INVENTOR
Rolf Lennart Ignell
BY Pierce, Scheffler & Parker
ATTORNEYS

Sept. 5, 1967    R. L. IGNELL    3,339,605
LID-COVERED CONTAINER

Filed Feb. 25, 1966    3 Sheets-Sheet 2

INVENTOR
Rolf Lennart Ignell
BY Pierce Scheffler & Parker
ATTORNEYS

Sept. 5, 1967 R. L. IGNELL 3,339,605
LID-COVERED CONTAINER
Filed Feb. 25, 1966 3 Sheets-Sheet 3
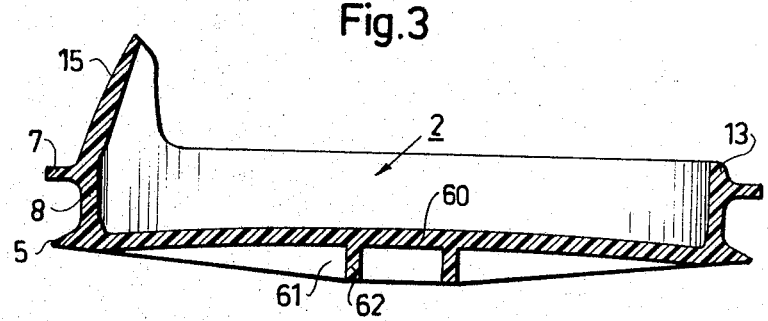
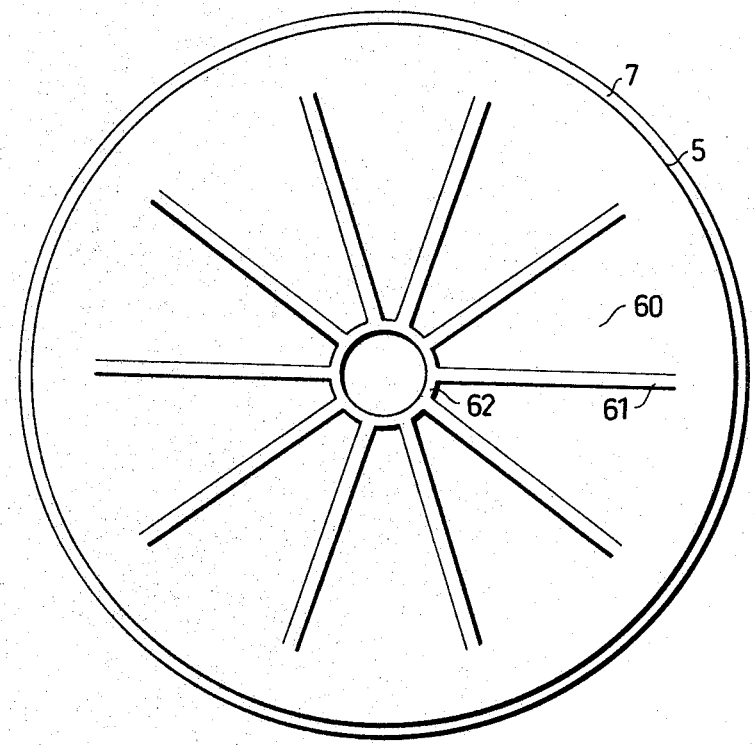
INVENTOR
Rolf Lennart Ignell
BY Pierce, Schiffler + Parker
ATTORNEYS United States Patent Office 3,339,605
Patented Sept. 5, 1967

3,339,605
LID-COVERED CONTAINER
Rolf Lennart Ignell, Lund, Sweden, assignor to
Anders R. Rausing, Blentarp, Sweden
Filed Feb. 25, 1966, Ser. No. 530,020
Claims priority, application Sweden, Mar. 18, 1965,
3,492/65
5 Claims. (Cl. 150—.5)

ABSTRACT OF THE DISCLOSURE

A container having a cylindrical, flexible and slightly stretchable side wall of synthetic plastic has a lid insertable in the mouth of the container, said lid having an annular edge portion of slightly greater diameter than the container and a resilient disk portion permitting the lid to bulge and the container wall, at least in the region of said lid, being provided with a non-yielding sleeve to prevent bulging of the side wall of the container.

---

Figure 1:
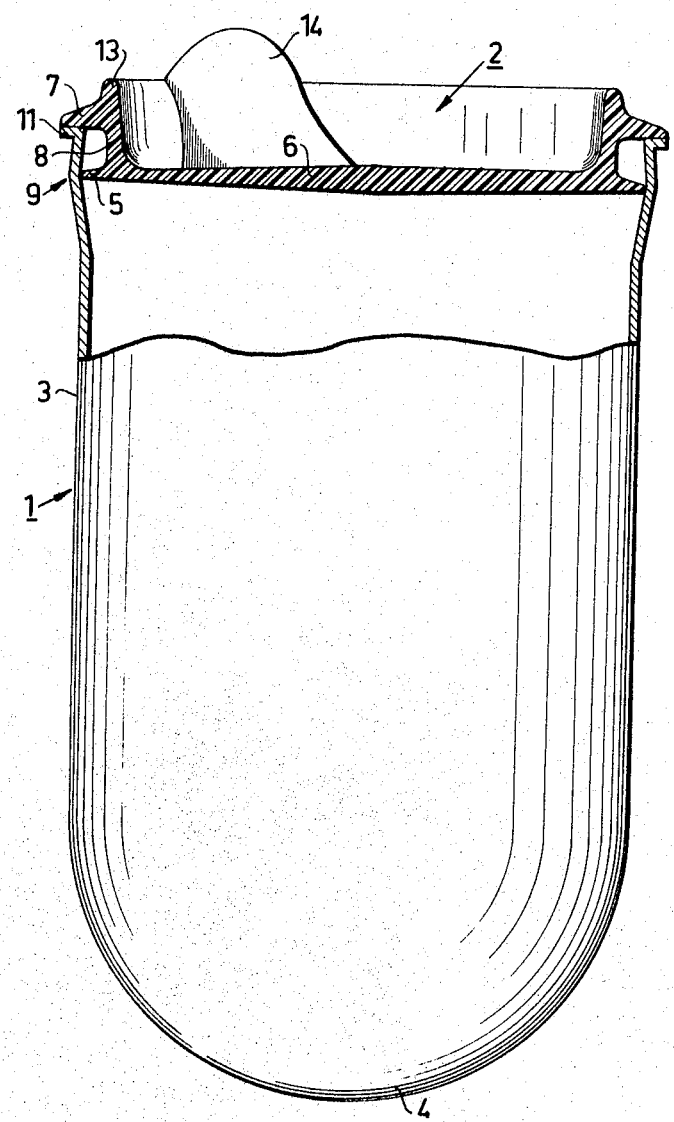

The present invention refers to the packaging art and is concerned with a container consisting of a tubular body closed at one end and having an opening closed by a lid.

During the last few years the employment of glass containers for distributing jam, marmalade and similar products has become a more and more heavy burden both for the foodstuff-industry and for the trade, in the first place depending on the high cost of the glass. In addition glass is a relatively heavy product, which naturally is a disadvantage and this has caused a search for new expedients for packaging such products. It would be natural, if somebody had conceived the idea of producing for example jam and marmalade jars from some suitable kind of plastic, but in practice there have been large obstacles to the realization of any plans therefor. The principal obstacles are of an economic kind. Plastic is, compared to glass, a relatively expensive product, and experience gained in glass manufacture could generally not be directly transferred to the plastic art. To reduce the costs it is thus necessary appreciably to reduce the wall thickness of the packages produced. The general characteristics of the material are then usually maintained to an acceptable extent, while on the other hand the stiffness is considerably reduced. This has presented a troublesome problem for the sealing of the emptying openings, more particularly in the case of such containers which are to be opened and closed again by means of a lid, cap or the like. Even though the container is made strong enough for the walls thereof to be able to take up forces occurring during the normal handling thereof, without being deformed to a troublesome extent, nevertheless it cannot, without the costs thereby rising to an inacceptably high level, be given such a generally heavy dimensioning that ordinary closing methods used for glass containers may be employed. Certainly, the wall thickness may be locally increased in the region of the closing means, but for this purpose special manufacturing methods and tools must be used, which make the final product more expensive. The present invention therefore has as its principal object to solve the sealing problem in a new and efficient manner while maintaining a relatively thin thickness of plastic. The invention is characterized by the fact that at least the part of the container which defines the opening thereof is manufactured from a relatively thin, yielding, flexible material, preferably plastic, and that the lid, which in its closing position is introduced into the container opening, comprises a central resilient disk and a peripheral edge-shaped margin, which sealingly presses against the container wall which alone is more yielding to radial forces than the lid, whereby said wall tends to bulge outwards in the region of said edge-shaped margin, said tendency however being opposed by a stiff, tubular supporting sleeve mounted on the outside of the container and nonyielding to normally occurring forces and having an inner circumference substantially equal to the outer circumference of the container, whereby the container maintains its original shape, while the lid is subjected to a deformation caused by compression.

Figure 2:
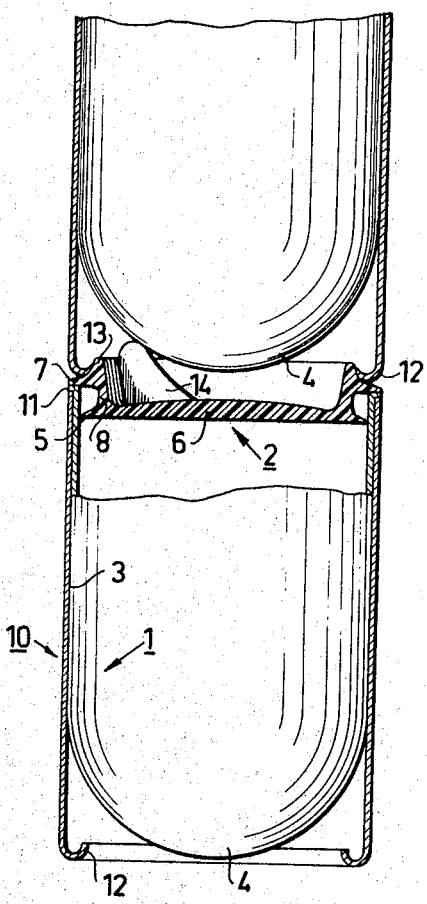

Further characteristics of the invention will appear from two preferred embodiments of the same which will be described with reference to the accompanying diagrammatic drawings, in which:

FIG. 1 shows how the container wall is yielding to the lid when no opposing forces are applied to the outside of the container, FIG. 2 illustrates an embodiment of the invention, FIG. 3 shows a section through a lid according to another preferred embodiment, and FIG. 4 shows the same lid as seen from the bottom.

In FIG. 1 a container 1 is shown which is manufactured from a thin resilient material, preferably some kind of plastic such as polystyrene, polyethylene or polyvinylchloride, and consists of a circular cylindrical body 3 which is open at one end and is provided at the other end with a curved bottom 4. Aluminium or a laminate including aluminium may for example also be conceived for use as a container material. The open end is closed by means of a lid 2. Polyethylene has proved to be the preferred material for the lid 2, although softened polyvinylchloride as well as certain hard types, such as styrene, may also be used. The lid 2 presents a peripheral edge 5 which may have a width of some tenth millimetres and a central disk- or lens-shaped portion 6. It is further provided with a radial flange 7, which extends slightly beyond the edge 5. The flange 7 is connected with the lid by a neck-shaped portion 8. Finally, the lid 2 is provided with an upper bead 13 the function of which will appear from the following.

As appears from FIG. 1 the lid 2 has been introduced into the container so far that the flange 7 engages the top edge of the container 1. The lid 2 as well as the container 1 are made from resilient material, but the container material is more yielding to radial forces than the lid 2. As the edge-shaped margin 5 of the lid 2 has a circumference which is slightly greater than the inner circumference of the container 1 and the lid 2 consequently must be pressed into the container opening at the closing thereof, the container wall 3, due to the greater yielding tendency of the latter, will bulge outwards in the region of the edge-shaped margin 5, unless counter-measures are taken. This region has been designated by 9 in FIG. 1. The tendency of bulging is of course undesirable, since the pressure of engagement between the lid and the container wall is thereby appreciably reduced. FIG. 2 illustrates how according to the invention the container 1 may be caused to maintain its original shape at the introduction of the lid 2, thereby providing good sealing effect.

The tendency of bulging in the region of the sharp margin 5 is opposed according to the invention by a stiff, tubular supporting sleeve 10 mounted on the outside of the container 1 and non-yielding to normally occurring forces and having an inner circumference equal to or at least substantially equal to the outer circumference of the container wall 3, whereby the container 1 maintains its original shape. Instead the lid 2 will be subjected to a deformation, on the one hand by a certain compression and on the other hand by a bulging outwards or inwards of its resilient, disk-shaped portion 6. The supporting sleeve 10, which is manufactured from cardboard, extends up to the top edge of the container 1, said edge there having a minor outwardly directed flange 11, and down some distance beyond the bottom portion 4 of the container 1. At its bottom part the edge 12 of the supporting sleeve 10 is bent inwardly and upwardly. This inturned edge has substantially the same width as the flange 7, whereby the edge 12 of the supporting sleeve 10, the flange 7 and the bead 13 may be advantageously utilised when stacking several packages on top of each other, as appears from FIG. 2.

A handle 14 consists of a plane vertically arranged plate, extending from the tubular portion 8 and the bead 13 radially inwards toward the lid center. The handle has its maximum height in its peripheral part and tapers in its inwardly extending portion. Thanks to the design of the handle one obtains several advantages. First, one receives a firm hold when pulling the lid out of the container. Second, the handle might be utilized also when re-closing the container, whereby one does not touch the other portions of the lid. Third, one can in a simple way keep the lid in a horizontal position during the re-closing operation, which is of importance as hereby a "dipping" of the edges of the lid into the filling material in the container might be prevented. Fourth the risk is prevented, thanks to the fact that the handle does not project beyond the periphery of the container but only in an upward direction, that the handle will hook to an adjacent container when packing the containers in transport boxes or the like, which would make the lid come loose. Finally the upwardly projection of the handle serves as a stabilizer in a stack consisting of several containers, the handle taking up the space between the spherical bottom portion 4 of the container and the lower edge portion of the sleeve 10.

The container closing device may of course be varied in a plurality of ways within the scope of the invention. FIGS. 3 and 4 thus illustrate an alternative embodiment of the lid 2. The edge-shaped margin 5, the flange 7, the neck-shaped portion 8 and the bead 13 are formed in the same way as in FIGS. 1 and 2. On the other hand, the central disk-shaped portion is slightly different. Instead of having a homogeneous, lens-shaped body the lid consists principally of a central, relatively thin disk 60. This is slightly curved upwards and on its under side provided with a number of stays 61 extending from the outer region of the central disk 60 towards a central annular elevation 62. The object of the structure is to provide a lid which has very good resilient properties at the same time as the consumption of material is appreciably reduced in relation to the embodiment earlier shown.

The lid according to FIG. 3 is further provided with a handle 15, which as to its design essentially differs from the handle 14, shown in FIG. 1. According to the embodiment shown in FIG. 3 the handle 15 consists of a continuation of the bead 13 and projects inwardly and upwardly and is also curved to the shape of the lid. As a result the handle, which owns all the features mentioned in connection with the previous seizing handle and which moreover is to prefer from a manufacturer's point of view.

I claim:
1. A container having a cylindrical side wall portion formed of a yielding, flexible synthetic plastic material of substantially uniform thickness, a closed bottom portion and a top opening extending to said side wall and a resilient lid for said opening having an annular edge-shaped marginal portion of slightly greater diameter than said opening and a central disk portion lying substantially in the same plane, and a substantially non-yielding sleeve tightly surrounding said cylindrical side wall at least in the region adjacent to said top opening.

2. A container as defined in claim 1 in which said lid comprises an annular flange portion of greater diameter than said edge-shaped marginal portion, said flange portion being spaced above said disk portion and connected thereto by a substantially cylindrical neck portion and an annular bead above said flange portion extending upwardly from said disk portion.

3. A container as defined in claim 2 in which said lid has a handle extending upwardly from said disk portion and radially inwardly from said cylindrical neck portion.

4. A container as defined in claim 2 in which said handle is curved and extends upwardly and inwardly from the upper surface of said bead.

5. A container as defined in claim 1 in which said closed end is hemispherical, said sleeve extends downwardly at least to the lower end thereof and said lid has an upwardly extending handle of such size and shape as to fit into the space between the lower edge of said sleeve and said hemispherical closed end when one container is stacked upon another container.

References Cited

UNITED STATES PATENTS

| | | | |
|---|---|---|---|
| 2,326,137 | 8/1943 | Gettelman | 220—69 XR |
| 2,669,370 | 2/1954 | Royall | 215—47 |
| 2,872,060 | 2/1959 | Brune et al. | 215—47 |
| 2,954,888 | 10/1960 | Bramming | 215—13 |
| 3,119,541 | 1/1964 | Lynn | 220—42 XR |
| 3,199,711 | 8/1965 | Nurkiewitz | 220—69 XR |

FRANKLIN T. GARRETT, Primary Examiner.